No. 893,393. PATENTED JULY 14, 1908.
J. W. SMITH.
MEANS FOR CONTROLLING THE STROKE OF FLUID OPERATED PISTONS.
APPLICATION FILED DEC. 11, 1907.

2 SHEETS—SHEET 1.

Witnesses.
J Raymond Stoover
M. L. Pugh

Inventor.
Joseph W. Smith
by Lindley Williamson
Attorneys.

No. 893,393. PATENTED JULY 14, 1908.
J. W. SMITH.
MEANS FOR CONTROLLING THE STROKE OF FLUID OPERATED PISTONS.
APPLICATION FILED DEC. 11, 1907.
2 SHEETS—SHEET 2.
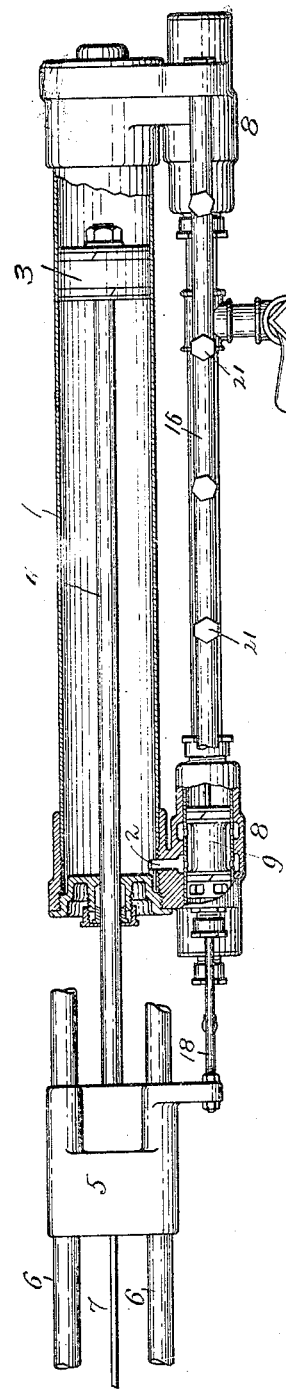
Witnesses.
Inventor.

UNITED STATES PATENT OFFICE.

JOSEPH W. SMITH, OF PORTLAND, OREGON.

MEANS FOR CONTROLLING THE STROKE OF FLUID-OPERATED PISTONS.

No. 893,393.   Specification of Letters Patent.   Patented July 14, 1908.

Original application filed February 23, 1906, Serial No. 302,483. Divided and this application filed December 11, 1907. Serial No. 406,070.

*To all whom it may concern:*

Be it known that I, JOSEPH W. SMITH, of Portland, in the county of Multnomah and in the State of Oregon, have invented a certain new and useful Improvement in Means for Controlling the Stroke of Fluid-Operated Pistons; and I do hereby declare that the following is a full, clear, and exact description thereof, reference being had to the accompanying drawing, in which—

Figure 1:
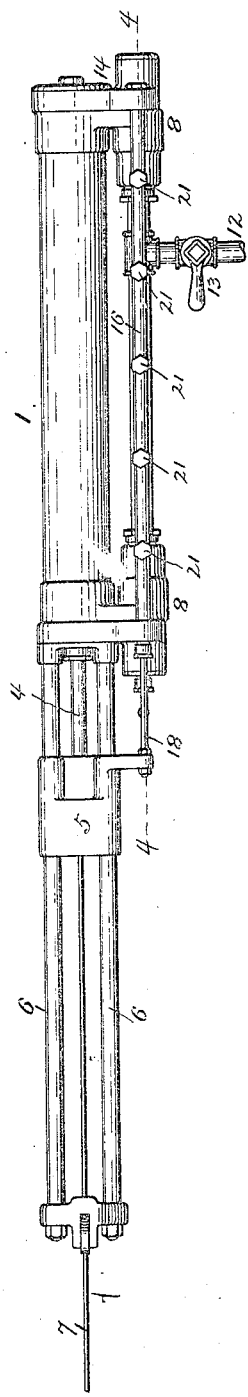
Figure 2:
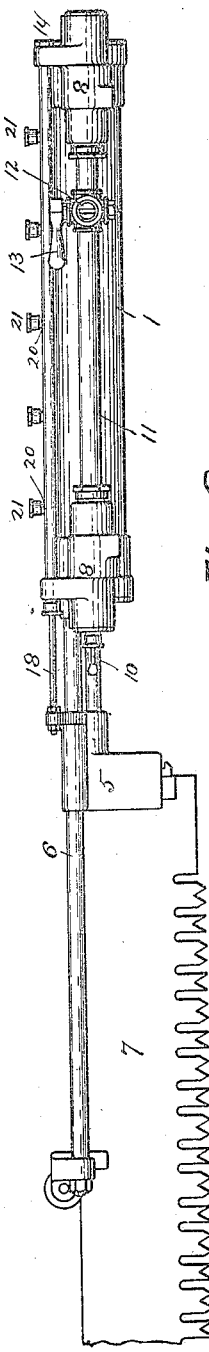

Figure 1 is a plan view of an embodiment of my invention adapted for a sewing machine; Fig. 2 a side elevation of the same; Fig. 3 a plan view of the cylinder and valve mechanism on an enlarged scale, partly in horizontal section; Fig. 4 a vertical section on the line 4—4 of Fig. 1; Fig. 5 a detail view on an enlarged scale of one of the stroke-adjusting devices; and, Fig. 6 a longitudinal section in detail of one of the valves.

The object of my invention, broadly stated, is to provide means for varying the stroke of fluid-pressure-operated pistons, and in particular to provide a valve mechanism for this purpose, whose operation will be quick, and to such ends, my invention consists in the mechanism constructed substantially as hereinafter specified and claimed.

For the purpose of illustrating my invention, I have selected an embodiment thereof for operating a saw, but though I select this as illustrating an embodiment of the invention, it is to be understood that the invention is applicable to steam or pneumatic hammers, riveters, drills, or any piston-operated machine, in which adjustment or variation of stroke, or quick cut-off is desired. In the instance shown, the engine is a double-acting one, the cylinder 1 having at each end a valve controlled port 2 and a piston 3, having its rod 4 connected to a cross-head 5 slidable on parallel guide rods 6, and to the cross-head 5 a saw 7 being attached at one end. In the valve chest 8, at each end of the cylinder, is a hollow piston valve 9, and the two valves 9 are connected by a rod 10 which passes through a pipe 11 that connects the two valve chests, and into which compressed air or other fluid under pressure is supplied by means of a pipe 12 having a hand operated valve 13. Leading from the outer end of each valve chest in an off-set or extension 14 thereof, is a port 15, and connecting the two chest extensions 14 is a tube or pipe 16 that extends parallel with the cylinder, in which pipe or tube is a closely fitting plunger or piston 17, from one end of which extends a piston rod 18 that passes outward through suitable stuffing box to an arm on the cross-head 5, to which it is bolted, so that the piston 17 will reciprocate with the piston 3 in the cylinder 1. When the piston 17 moves in one direction, the air in the tube 16 in advance of it will be compressed, and passing through the port 15 will act upon the piston valve 9 at that end of the cylinder towards which the piston 17 is moving, and subjecting said piston thereof to the required pressure will shift the same, and when the piston 17 moves in the opposite direction, it will produce a similar effect upon the other piston valve 9, but in the opposite direction. When a valve 9 reaches the limit of its movement, under pressure from the piston 17, air exhausts or escapes to the atmosphere through a port 8$^a$ in the valve chest.

It will be seen that, by varying the volume or quantity of the air between each valve 9 and the piston 17, the point of cut-off may be varied, or the stroke of the operating piston 3 may be lengthened or shortened. To vary the volume of the air between the piston 17 and the valves 9, I provide at suitable intervals along the tube 16 a series of ports 19, each leading to a threaded nipple 20, on which is screwed a cap 21 having holes or perforations 22 in its sides which, by the proper turning of the cap, may be placed into or out of communication with the interior of the nipple, and so with the interior of the tube or pipe 18, and place the latter in communication with the external air through a particular port, or cut-off such communication with the external air, either partially or wholly. It will be seen that, by means of the adjustment of the caps 21, which may wholly or partially close their respective ports, the volume of air in the tube 16 in advance of its piston may be varied, and thus the time of operation of the piston valves controlled to suit the point of cut-off or length of stroke of the operating piston 3 that is desired.

It will be seen that the mechanism for carrying my invention into practice is not only extremely simple, but it is thoroughly efficient and the operation of the piston valves quick.

The subject-matter of this application is a division of my application No. 302,483, filed Feb. 23, 1906.

Having thus described my invention, what I claim is—

1. The combination of a working piston, a fluid-pressure-operated valve for controlling the supply of fluid under pressure to such piston, a piston for operating said valve, and means for varying the volume of fluid between said piston and said valve.

2. The combination of a working piston, a fluid-pressure operated valve for controlling the supply of fluid under pressure to such piston, a piston for operating said valve, means for varying the volume of fluid between said piston and said valve, and connections between said piston and the working piston.

3. The combination of a working piston, a fluid-pressure-operated valve for controlling the supply of fluid under pressure to such piston, a piston for operating said valve, and a cylinder for said piston having a series of outlets adapted to be opened and closed.

4. The combination of a working piston, a cylinder therefor, a fluid-pressure-operated valve for controlling the admission of fluid under pressure to each end of the cylinder, a second cylinder in communication with said valves, a piston in said second cylinder, and a series of outlets in said second cylinder adapted to be opened and closed.

In testimony that I claim the foregoing I have hereunto set my hand.

JOSEPH W. SMITH.

Witnesses:
 TRUMAN J. GLOVER,
 LESTER L. CURL.